United States Patent [19]

Berkman

[11] 4,432,453
[45] Feb. 21, 1984

[54] STORAGE SYSTEM FOR EITHER BOXED OR UNBOXED CASSETTES

[75] Inventor: Joseph L. Berkman, Mamaroneck, N.Y.

[73] Assignee: Berkman Industries, Inc., Boynton Beach, Fla.

[21] Appl. No.: 429,200

[22] Filed: Sep. 30, 1982

[51] Int. Cl.³ .................. B65D 85/30; B65D 85/62
[52] U.S. Cl. ................................ 206/387; 206/493
[58] Field of Search ............. 206/387, 73, 541, 453, 206/458, 449, 493; 229/15; 190/28; 312/200

[56] References Cited

U.S. PATENT DOCUMENTS

| | | | |
|---|---|---|---|
| 3,756,383 | 9/1973 | Kryter | 206/387 |
| 3,856,369 | 12/1974 | Commiant | 206/387 |
| 3,907,116 | 9/1975 | Wolf et al. | 206/387 |
| 4,003,468 | 1/1977 | Berkman | 206/387 |
| 4,117,931 | 10/1978 | Berkman | 206/387 |
| 4,231,473 | 11/1980 | Aprahamian | 206/387 |

Primary Examiner—Joseph Man-Fu Moy
Attorney, Agent, or Firm—Lackenbach, Siegel, Marzullo, Presta & Aronson

[57] ABSTRACT

A case having at least one row and a plurality of tandem compartments for interchangeably receiving and storing either a single boxed cassette or two unboxed cassettes in any compartment. The case has opposite side walls connected by means of a bottom wall, with the compartments disposed parallel and transverse to the opposite side walls; each compartment comprising a pair of projections separating and dividing the said compartment into storage zones on both sides of said projections. The opposite side walls define pairs of vertical ribs for guiding and securely retaining a single boxed cassette in place atop said projections, and further define vertical end stops adjacent said ribs for limiting transverse movement of unboxed cassettes stored and securely retained between said projections and opposite guides projecting inwardly from said side walls.

12 Claims, 7 Drawing Figures

STORAGE SYSTEM FOR EITHER BOXED OR UNBOXED CASSETTES

This invention relates to the storage of cassettes, and more particularly to a case or storage system capable of interchangeably receiving and storing either boxed or unboxed cassettes.

BACKGROUND OF THE INVENTION

Magnetic tape recordings have heretofore generated the production and sale of storage cases of varied constructions and configurations. Each such structure, however, was designed to handle a particular arrangement of magnetic tape enclosures. For example, my own U.S. patents in this art area are identified hereinbelow: Nos.

D237,338
D233,375
D230,528
D230,527
3,889,817
4,003,468
4,117,931

Other prior art references are U.S. Pat. No. 3,736,036 which discloses a polygonal-shaped cabinet defining a plurality of side storage compartments. Each compartment having dividers forming pockets orthogonally to each other so that in one direction boxed cassettes are stored and in a transverse direction unboxed cassettes are capable of being stored.

In another holder for cassettes as described in U.S. Pat. No. 3,856,369, the front side of a box is open and the bottom is divided into parallel compartments for cassettes. A spring in each compartment raises the corner of a cassette up to a stop, whereby the spring is released and pushes the cassette frontwards so as to project itself and be easily gripped for removal.

In the Cassette Rack of U.S. Pat. No. 3,907,116, a rack with sloping shelves holds both boxed and unboxed cassettes, with the shelves cut away to define nesting recesses for holding the smaller unboxed cassettes.

U.S. Pat. No. 3,756,383 to Kryter teaches a case for either boxed cassettes or unboxed cassettes. Here, sets of ribs are provided at the front and rear faces of the case to enable transverse parallel storage of cassettes between the horizontal ribs and similar storage of the boxes therefor between the vertical ribs, but with the latter elevated upon the horizontal ribs.

None of the prior art patents, however, disclose a storage case wherein each compartment or bin is capable of holding one boxed cassette or two unboxed cassettes.

SUMMARY OF THE INVENTION

Accordingly, it is the principal object of the present invention to provide a case which is capable of receiving and storing in every compartment or bin either a single boxed cassette or two unboxed cassettes.

It is another object of the invention to provide a case which is simple in construction and economical to manufacture.

Another object is to provide a case of any size, and one which can be made of most available materials.

Accordingly, the present invention is achieved by a case comprising opposite side walls connected to a bottom wall, and parallel compartments disposed transverse to the opposite side walls. Each compartment comprising a pair of projections separating and dividing said compartment into storage zones on either side of the projections. The opposite side walls define pairs of vertical ribs for guiding and securely retaining a single boxed cassette in place atop the projections, and further define vertical end stops adjacent the ribs for limiting transverse movement of unboxed cassettes stored and securely retained between the projections and opposite guides projecting inwardly from the side walls.

BRIEF DESCRIPTION OF THE DRAWINGS

The invention will now be described with reference to the accompanying drawings, wherein.

DESCRIPTION OF THE PREFERRED EMBODIMENTS

Figure 1:
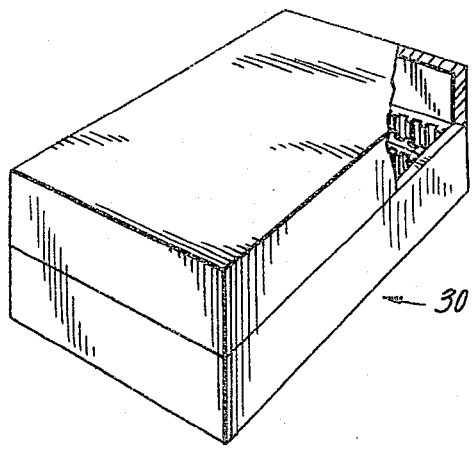
FIG. 1 is a persepctive view of a cabinet module embodying the storage system of the invention.

Referring now to FIGS. 4–7, the storage system 10 may simply comprise a tray-like article for use along or as an insert in a case or cabinet module. The storage system or article 10 is provided with a series of identical tandem compartments 12, each of which is capable of receiving and storing either one boxed cassette or two unboxed cassettes. For example, any convenient storage size may be employed, say to hold 12, 24, 30 or 36 boxed cassettes, or to hold 24, 48, 60 or 72 unboxed cassettes.

Figure 4:
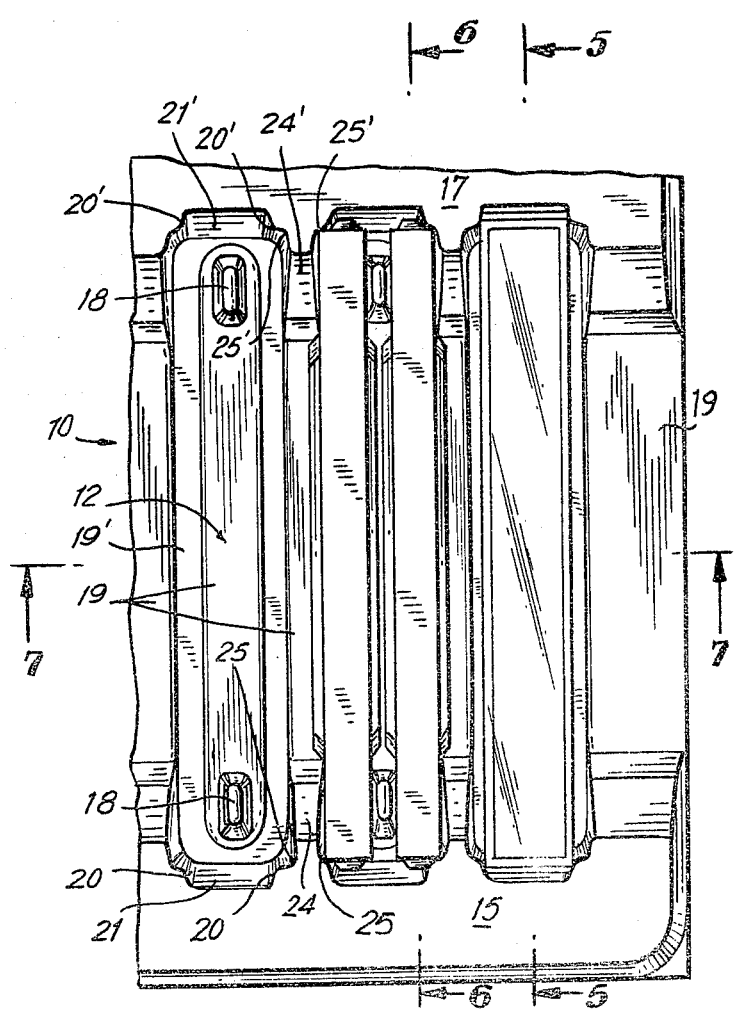
FIG. 4 is a plan view of the storage system showing three compartments, one being empty and the other two occupied.
Figure 5:
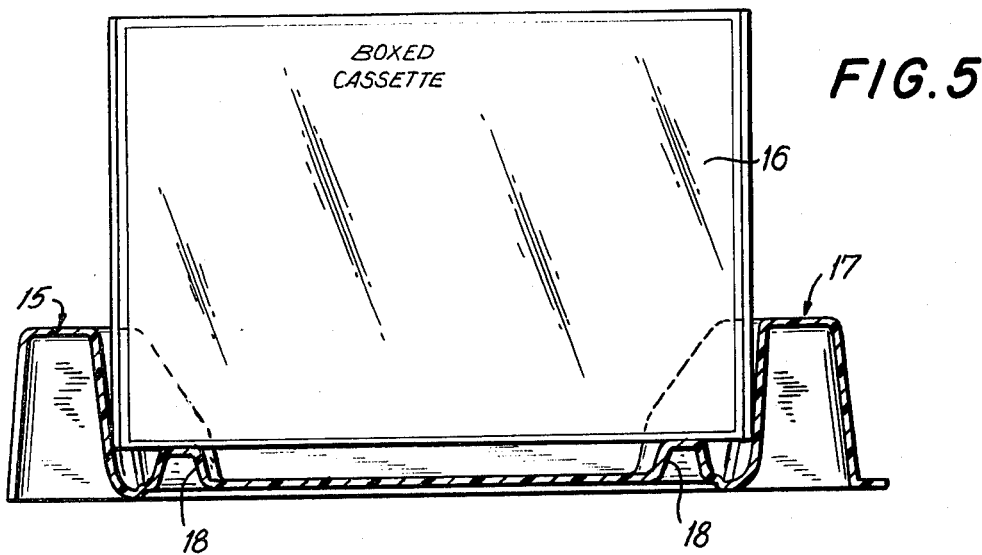
FIG. 5 is a cross-sectional view taken along the line 5—5 of FIG. 4.
Figure 7:
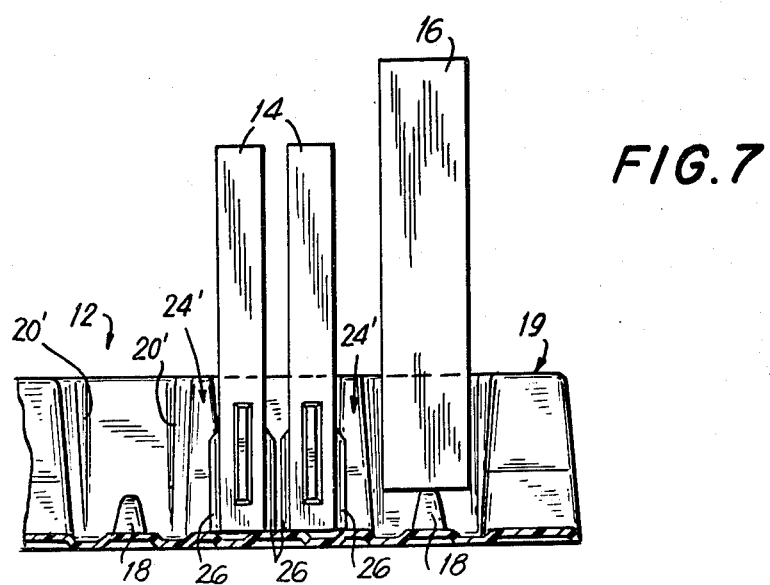
FIG. 7 is a cross-sectional view taken along the line 7—7 of FIG. 4.

As best shown in FIGS. 4 and 7, the center compartment or bin 12 illustrates how two unboxed cassettes 14 are held in place, while the adjacent compartments simply show a blank bin 12 and a single boxed cassette 16 in the other compartment or bin. As shown in FIG. 5, the boxed cassette 16 is seated upon projections or ribs 18 upwardly standing from the bottom 19 of the tray. Such ribs 18 can also be secured to the front 15 and rear 17 walls. Pairs of oppositely disposed vertical ribs 20, 20' securely retain the boxed cassette 16 in place between opposite end walls 21, 21'; until it is gripped and removed from the compartment or bin 12.

Figure 6:
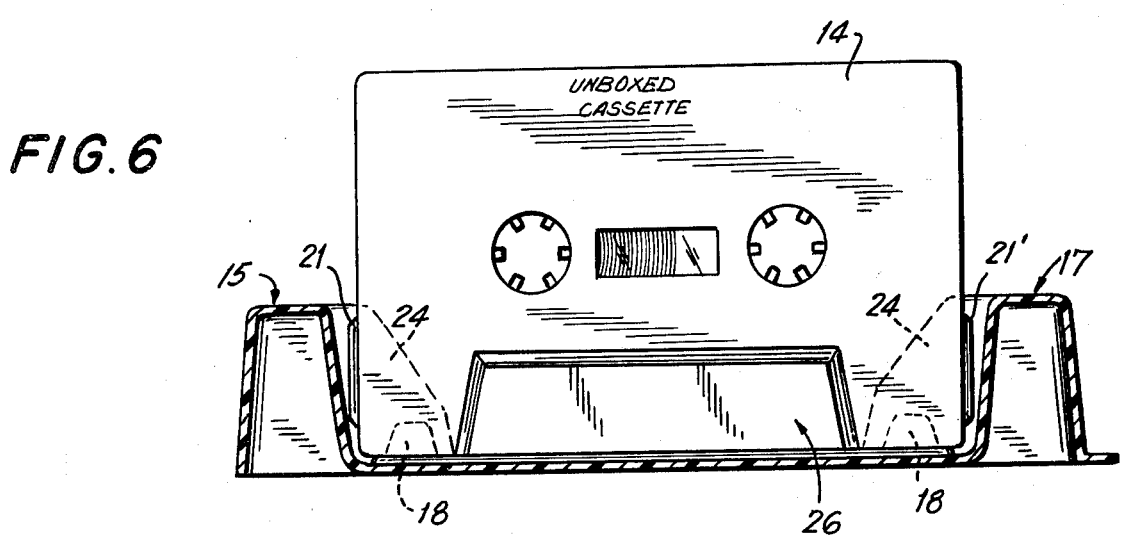
FIG. 6 is a cross-sectional view taken along the line 6—6 of FIG. 4.

Alternately, and as best shown in FIGS. 4 and 6–7, one or both of the two unboxed cassettes 14 also can be retained securely in place in the same compartment or bin 12 as the boxed cassette 16. However, here each unboxed cassette 14 is positioned against the bottom surface 19 of the tray-like article 10, which may be suitably provided with trough-like ribs 19' to provide strength to bottom of the article. In addition, each unboxed cassette 14 is positioned between the ribs 18 and a side wall projecting guide 24, 24'. The side wall projecting guide 24, 24' also serving as an end stop 25, 25' for limited sidewise movement of the unboxed cassette 14. It should be noted that the ribs 18 should be short enough so that they do not interfere with the thickest portion 26 of an unboxed cassette 14. Similarly, the projecting guides 24, 24' do not extend transversely across the bin 12 as the thickest portions 26 of a pair of adjacently disposed unboxed cassettes 14 just clear each other, as best shown in FIG. 7.

Thus, with the storage system of the invention, an article, such as an insert or case may be fabricated, suitably from materials, such as wood, metal, paper, plastic, or in the case of plastic materials injection molded or vacuum formed to create a storage device having plural compartments in one or more rows of compartments. For example, a case may be provided with two rows of six compartments each or two rows of twelve compartments each. In all cases, each compartment or bin is capable of interchangeably receiving and storing either one boxed cassette or two unboxed cassettes.

Figure 3:
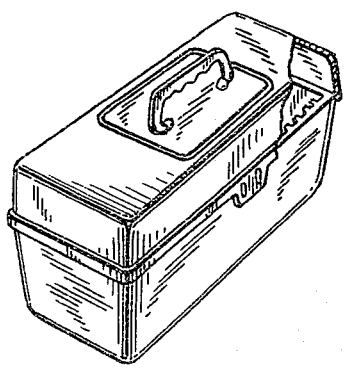
FIG. 3 is a further perspective view of an alternate form of the valise embodiment, wherein the compartments or bins for holding and storing either the boxed or unboxed cassettes are integrally formed into the case.

It should be appreciated that the storage device can be employed by itself or it can be used as an insert fastened to the inside of a suitable cabinet module or valise. Alternatively, the storage device can be conveniently molded on the inside of a case, as is best shown in the modification of FIG. 3. This modification is similar to any storage case device disclosed in U.S. Pat. No. 4,117,931, which is incorporated herein by reference.

Figure 2:
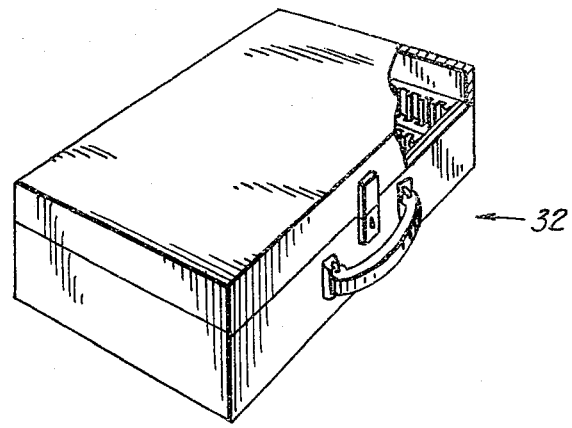
FIG. 2 is another perspective view, but of a valise embodiment of the invention.

Other alternate embodiments of the invention are shown in FIGS. 1 and 2, wherein both a cabinet module 30 and portable valise 32 structure are respectively illustrated. In these modifications of the invention, the storage device or tray-like article can be suitably secured to the bottom portion of the cases which have hinged covers forming part of the overall constructions. Other examples of like cases are shown in my U.S. Pat. No. 4,117,931, which is also incorporated herein by reference.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A storage case for magnetic tape cassettes and tape cassette boxes comprising at least one row having a plurality of tandem compartments for interchangeably receiving and storing either a boxed cassette or a pair of unboxed cassettes in the same compartment, each said compartment having opposite side walls connected by means of a bottom wall, and having twin parallel storage zones disposed transverse to said opposite side walls; each said compartment further comprising projection means separating and dividing said compartment into said twin parallel storage zones on either side of said projection means; said opposite side walls having pairs of vertical ribs for guiding and securely retaining a single boxed cassette in place in said compartment atop said projection means, and vertical end stops adjacent said vertical ribs for limiting transverse movement of unboxed cassettes stored and securely retained between said projection means and oppositely disposed compartment separating guides projecting inwardly from said opposite side walls.

2. The case according to claim 1, wherein said projection means extend from said bottom wall.

3. The case according to claim 1, wherein said projection means extend from said opposite side walls.

4. The case according to claim 3, wherein said projection means also extending from said bottom wall.

5. The case according to claim 1, wherein said vertical ribs and said vertical end stops are unitary and form corner projections in the corners of each compartment.

6. The case according to claim 5, wherein said guides project inwardly from adjacent corner projections of each pair of compartments in the manner of a flying buttress.

7. The case according to claim 1, wherein said bottom wall is ribbed or corrugated-like.

8. The case according to claim 1, wherein said case forms an insert for a cabinet module having a hinged cover.

9. The case according to claim 8, wherein said hinged cover is transparent.

10. The case according to claim 1, wherein said case forms an insert for a valise having a hinged cover and handle means.

11. The case according to claim 10, wherein said case and valise are internally made from a plastic material.

12. The case according to claim 1, wherein said case is in the form of a tray-like article for use either alone in storing boxed magnetic tape cassettes, a double amount of unboxed magnetic tape cassettes, or any desired combination of boxed and unboxed magnetic tape cassettes.

* * * * *

UNITED STATES PATENT AND TRADEMARK OFFICE
CERTIFICATE OF CORRECTION

PATENT NO. : 4,432,453
DATED : February 21, 1986
INVENTOR(S) : Joseph L. Berkman It is certified that error appears in the above—identified patent and that said Letters Patent is hereby corrected as shown below:

At column 2, line 36 delete "along" and insert --alone--.

At column 4, line 42 (claim 11, line 2) delete "internally" and insert -- intergrally --.

Signed and Sealed this

Fifth Day of August 1986

[SEAL]

Attest:

DONALD J. QUIGG

Attesting Officer

Commissioner of Patents and Trademarks